US012761636B2

(12) United States Patent
Atsuta et al.

(10) Patent No.: US 12,761,636 B2
(45) Date of Patent: Oct. 13, 2026

(54) MOLDING MANAGEMENT SYSTEM

(71) Applicant: SEIKO EPSON CORPORATION, Tokyo (JP)

(72) Inventors: Kosuke Atsuta, Shiojiri (JP); Soji Shiozawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 329 days.

(21) Appl. No.: 18/613,619

(22) Filed: Mar. 22, 2024

(65) Prior Publication Data

US 2024/0319720 A1 Sep. 26, 2024

(30) Foreign Application Priority Data

Mar. 24, 2023 (JP) ................................ 2023-048306

(51) Int. Cl.
*G05B 19/418* (2006.01)

(52) U.S. Cl.
CPC .................. *G05B 19/41875* (2013.01); *G05B 2219/32368* (2013.01)

(58) Field of Classification Search
CPC ................ G05B 19/41875; G05B 2219/32368
See application file for complete search history.

(56) References Cited

U.S. PATENT DOCUMENTS

| | | | | |
|---|---|---|---|---|
| 5,275,768 A | | 1/1994 | Inaba et al. | |
| 6,522,939 B1 | * | 2/2003 | Strauch | G05B 19/41875 700/109 |
| 2007/0045887 A1 | * | 3/2007 | Boor | B29C 31/10 264/40.7 |
| 2013/0325155 A1 | * | 12/2013 | Ryznar | G05B 19/41805 700/95 |
| 2017/0031335 A1 | * | 2/2017 | Sakakibara | G05B 19/042 |
| 2019/0206049 A1 | * | 7/2019 | Taheri | G06F 3/0482 |
| 2022/0187812 A1 | * | 6/2022 | Shibuya | G05B 19/41875 |
| 2022/0284699 A1 | * | 9/2022 | Walt | B23Q 17/20 |
| 2022/0291653 A1 | * | 9/2022 | Yogo | G05B 19/052 |

FOREIGN PATENT DOCUMENTS

| | | | |
|---|---|---|---|
| JP | H05-286005 | A | 11/1993 |
| JP | H10-166410 | A | 6/1998 |
| JP | 2000-094489 | A | 4/2000 |
| JP | 2003-099501 | A | 4/2003 |
| JP | 2019-119172 | A | 7/2019 |

* cited by examiner

*Primary Examiner* — Ziaul Karim
(74) *Attorney, Agent, or Firm* — Harness, Dickey & Pierce, P.L.C.

(57) ABSTRACT

A molding management system includes a memory and a processor. The processor is configured to execute a program so as to store a plurality of pieces of device identification information relating to a plurality of devices, store master data including a plurality of pieces of defect classification information, receive selection of the device identification information, output and display defect classification information associated with the selected device identification information among the plurality of pieces of defect classification information, output and not display defect classification information associated with device identification information other than the selected device identification information, and receive, in a case where the defect occurs in the molded article, selection of the defect classification information in association with the device identification information of one of the plurality of devices when the defect occurs.

3 Claims, 7 Drawing Sheets

MOLDING MANAGEMENT SYSTEM

The present application is based on, and claims priority from JP Application Serial Number 2023-048306, filed Mar. 24, 2023, the disclosure of which is hereby incorporated by reference herein in its entirety.

BACKGROUND

1. Technical Field

The present disclosure relates to a molding management system.

2. Related Art

In a program and an information processing device disclosed in JP-A-2019-119172, tag data in which a shot number is associated with a non-defective tag indicating that a molded article is a non-defective article or a defective tag indicating that a molded article is a defective article is stored in a storage device in association with temperature data, pressure data, and flow velocity data in a metal mold. The tag data described above is data input by a user using an input interface such as a keyboard.

JP-A-2019-119172 is an example of the related art.

SUMMARY

In a case where a defect occurs in production of a molded article or in a case where a defect is detected in a molded article, a user may store detailed information about the defect in association with a device used in production of the molded article when the defect occurs in the molded article or a material of the molded article or a device that detects the defect in the molded article in a molding management system. In this case, when the user inputs the detailed information about the defect using a keyboard or the like, there is a problem that it takes time to input the information.

According to a first aspect of the present disclosure, a molding management system is provided. The molding management system includes: a device storage unit configured to store a plurality of pieces of device identification information that are identification information of a device used in production of a molded article and including at least a molding machine; a defect classification storage unit configured to store master data including a plurality of pieces of defect classification information that are information related to classification of a defect of the molded article or a material used in molding the molded article; a first receiving unit configured to receive selection of the device identification information stored in the device storage unit; a second receiving unit configured to receive selection of the defect classification information provided in the master data; a device defect storage unit configured to store the device identification information received by the first receiving unit and the defect classification information received by the second receiving unit in association with each other; and a third receiving unit configured to receive, in a case where the defect occurs in the molded article or the material, selection of the defect classification information stored in the device defect storage unit in association with the device identification information of the device used in production of the molded article when the defect occurs, or in a case where the defect is detected in the molded article, selection of the defect classification information stored in the device defect storage unit in association with the device identification information of the device that detects the defect.

DESCRIPTION OF EMBODIMENTS

A: First Embodiment

Figure 1:
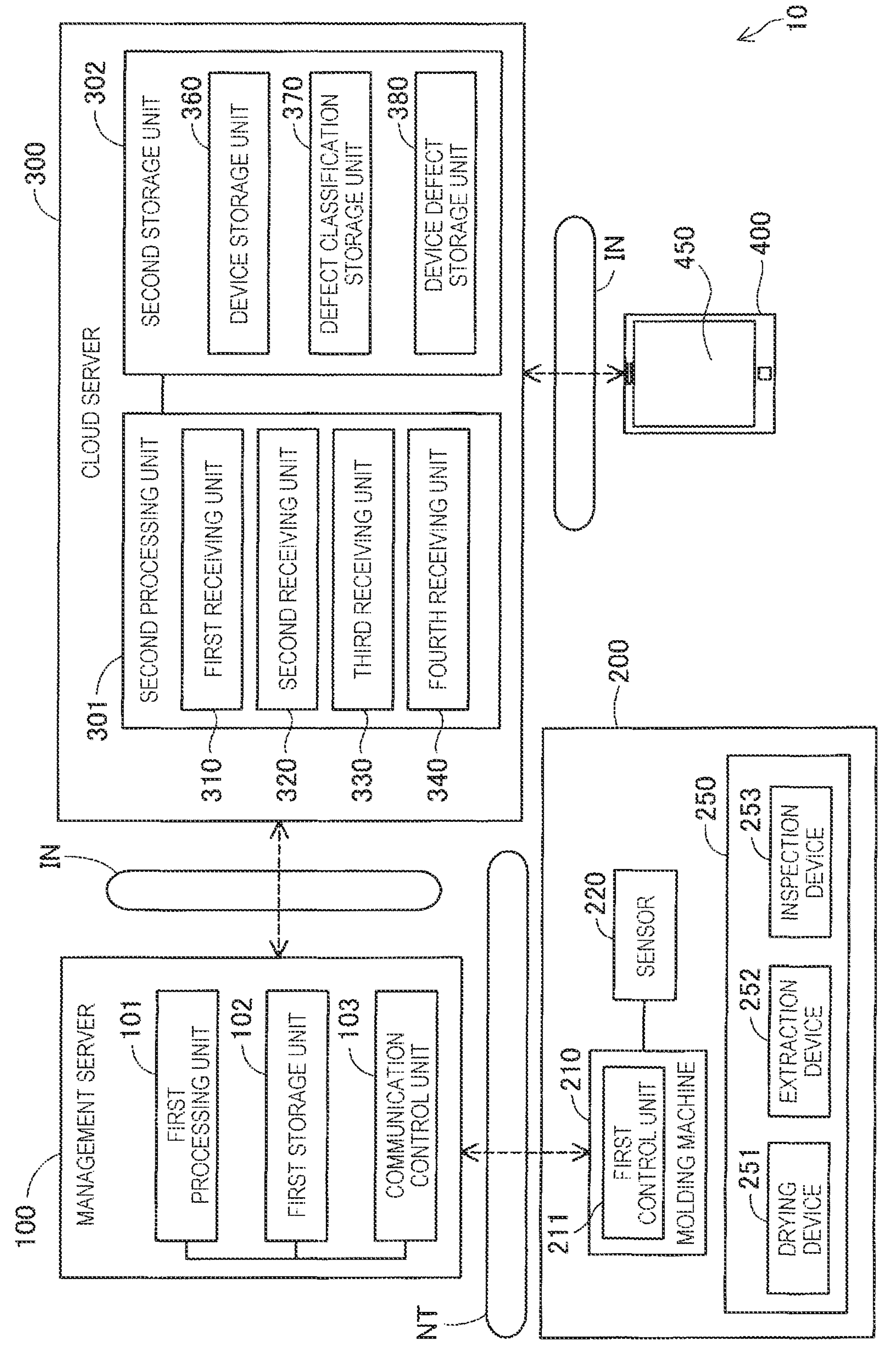
FIG. 1 is a diagram illustrating a schematic configuration of a molding management system.

FIG. 1 is a diagram illustrating a schematic configuration of a molding management system 10. The molding management system 10 includes a management server 100, a molding unit 200, a cloud server 300, and a terminal device 400. The molding unit 200 includes a molding machine 210, a sensor 220, and a peripheral machine 250. The management server 100 is configured to communicate with the molding machine 210 via a network NT. The network NT may be, for example, a LAN, a WAN, or an Internet. The cloud server 300 is configured to communicate with the management server 100 and the terminal device 400 via an Internet IN. Although FIG. 1 illustrates an example in which the molding management system 10 includes one molding unit 200, the molding management system 10 may include a plurality of molding units 200.

The molding machine 210 is a device used in production of a molded article. The molding machine 210 molds a molded article. The molding machine 210 is a horizontal molding machine, a multicolor molding machine, a vertical molding machine, or the like. The horizontal molding machine is an injection molding machine that includes an inline screw or a flat screw and in which an injection device and a mold clamping device are arranged in a horizontal direction. In the present specification, the horizontal molding machine is also simply referred to as a molding machine. The multicolor molding machine is an injection molding machine capable of molding a molded article in which resins of different colors and materials are integrated. The vertical molding machine is an injection molding machine in which an injection device and a mold clamping device are arranged in a vertical direction. The molding machine 210 may be an insert molding machine, a hoop molding machine, or a blow molding machine.

The injection molding machine 210 includes a first control unit 211, an injection device (not illustrated), and a mold clamping device (not illustrated). A mold having a cavity is attached to the mold clamping device. The mold may be made of a metal, ceramic, or a resin. A mold made of a metal is referred to as a metal mold. The first control unit 211 is implemented by a computer including one or more processors, a storage device, and an input and output interface that inputs a signal from and outputs a signal to the outside. The first control unit 211 may be implemented by a plurality of computers. The molding machine 210 may include a display device such as a liquid crystal display and an input device such as a keyboard.

The first control unit 211 performs injection molding by controlling units of the molding machine 210 based on molding conditions acquired from the cloud server 300 via the management server 100, and molds a molded article. More specifically, the first control unit 211 controls the mold clamping device to clamp the mold, and controls the injection device to inject a shaping material obtained by plasticizing a material into the mold, thereby molding a molded article having a shape corresponding to a shape of the cavity formed in the mold.

The sensor 220 measures injection pressure, a temperature of the metal mold, an injection filling time, and the like that are physical quantities related to an operation state of the molding machine 210. The sensor 220 is, for example, a pressure sensor that measures injection pressure or a temperature sensor that measures a temperature of the metal mold. The sensor 220 transmits a measured physical quantity related to an operation state of the molding machine 210 to the management server 100 via the first control unit 211 of the molding machine 210. The sensor 220 may be configured to communicate with the management server 100 via a network NT. In this case, the sensor 220 may transmit a measured physical quantity related to an operation state of the molding machine 210 to the management server 100 without passing through the first control unit 211.

The peripheral machine 250 is a device used in production of a molded article. The peripheral machine 250 is integrated with the molding machine 210. In the embodiment, the molding unit 200 includes a drying device 251, an extraction device 252, and an inspection device 253 as the peripheral machine 250. The molding unit 200 may include a plurality of each of the peripheral machines 250. The peripheral machine 250 may be configured to communicate with the management server 100 via the network NT.

The drying device 251 is a device that dries a material used in the molding machine 210, that is, a material used for molding a molded article. Hereinafter, a material used for molding a molded article is simply referred to as a material. For example, the drying device 251 removes moisture in the air using a moisture absorbent, heats dry air using a heater, and sends the heated dry air to a drying hopper, thereby drying a material stored in the drying hopper.

The extraction device 252 is a device that extracts a molded article molded by the molding machine 210 from the molding machine 210. For example, the extraction device 252 suctions a molded article to extract the molded article from a mold of the molding machine 210.

The inspection device 253 is a device that inspects a molded article. The inspection device 253 includes a control unit (not illustrated) and a camera (not illustrated). The control unit controls the camera to capture an image of a molded article, and analyzes the captured image of the molded article, thereby performing dimension measurement and appearance inspection of the molded article.

The management server 100 is implemented by a computer including a first processing unit 101, a first storage unit 102, and a communication control unit 103. The first processing unit 101 includes one or more processors and a main storage device. The first storage unit 102 is implemented by an auxiliary storage device such as a hard disk drive. The communication control unit 103 includes a communication circuit for controlling communication with another device such as the cloud server 300 and the molding machine 210. The management server 100 may be implemented by a plurality of computers. The management server 100 may include a display device such as a liquid crystal display and an input device such as a keyboard and a mouse.

The first processing unit 101 acquires a physical quantity related to an operation state of the molding machine 210 transmitted from the sensor 220. The physical quantity related to an operation state of the molding machine 210 acquired by the first processing unit 101 is stored in the first storage unit 102. The first processing unit 101 may transmit the physical quantity related to an operation state of the molding machine 210 to the cloud server 300. In this case, the physical quantity related to an operation state of the molding machine 210 is stored in a second storage unit 302 of the cloud server 300.

The terminal device 400 is implemented as a computer including a CPU, a storage device, and a display unit 450. Examples of the terminal device 400 include a tablet terminal, a notebook computer, a smartphone, or a handy terminal. The display unit 450 displays various screens output from the cloud server 300. The display unit 450 may have a touch panel function. The terminal device 400 is also referred to as an information terminal.

The cloud server 300 is a server used via an Internet IN. The cloud server 300 includes a second processing unit 301 and the second storage unit 302. The first storage unit 102 of the management server 100 and the second storage unit 302 of the cloud server 300 are also collectively referred to as a storage unit. The management server 100 and the cloud server 300 may be implemented as one server.

The second storage unit 302 includes a device storage unit 360, a defect classification storage unit 370, and a device defect storage unit 380.

The device storage unit 360 stores a plurality of pieces of device identification information that are identification information of devices used in production of a molded article. Specifically, the device storage unit 360 stores identification information of the molding machine 210 and the peripheral machine 250. The device identification information is identification information assigned to each device. The device identification information includes a device name, an ID number assigned to each device, or the like.

The defect classification storage unit 370 stores master data including a plurality of pieces of defect classification information that are information related to classification of defects of a molded article or a material. The master data includes defect classification information of a defect specific to each device for all devices that are used in production of a molded article and are provided in the molding management system 10. The defect classification information includes a threshold abnormality, folding (molding), deformation (molding), damage (molding), a short shot (a first color), a short shot (a second color), injection pressure (a first color), injection pressure (a second color), stain (vertical), a bubble (vertical), a transfer defect (vertical), discoloration (drying), falling (extraction), folding (extraction), deformation (extraction), damage (extraction), burning, discoloration, damage, a burr, a weld line, a flow mark, a geometric tolerance, a dimensional defect, and the like. Here, the threshold abnormality refers to that a measured value such as injection pressure or a metal mold temperature exceeds an upper limit value of a threshold or falls below a lower limit value of a threshold. The short shot (a first color) refers to that a cavity is not sufficiently filled with a shaping material of the first color when the shaping material is injected into a mold in molding of a molded article using a multicolor molding machine. The short shot (a second color)

refers to that a cavity is not sufficiently filled with a shaping material of the second color different from the first color in molding of the molded article using the multicolor molding machine. The injection pressure (a first color) refers to that injection pressure of a shaping material of the first color exceeds an upper limit value of a threshold or falls below a lower limit value of a threshold in molding of the molded article using the multicolor molding machine. The injection pressure (a second color) refers to that injection pressure of a shaping material of the second color exceeds an upper limit value of a threshold or falls below a lower limit value of a threshold in molding of the molded article using the multicolor molding machine. The transfer defect (vertical) refers to that a shape of a surface of a cavity is not correctly transferred to a surface of a molded article due to the presence of air or moisture inside a mold in molding of a molded article using a vertical molding machine.

Among the defect classification information described above, the threshold abnormality, the folding (molding), the deformation (molding), and the damage (molding) are defect classification information of defects specific to the molding machine. The short shot (a first color), the short shot (a second color), the injection pressure (a first color), and the injection pressure (a second color) are defect classification information of defects specific to the multicolor molding machine. The stain (vertical), the bubble (vertical), and the transfer defect (vertical) are defect classification information of defects specific to the vertical molding machine. The burning (drying) and the discoloration (drying) are defect classification information of defects specific to the drying device 251. The falling (extraction), the folding (extraction), the deformation (extraction), and the damage (extraction) are defect classification information of defects specific to the extraction device 252. The geometric tolerance and the dimensional defect are defect classification information of defects specific to the inspection device 253.

The device defect storage unit 380 stores device identification information and defect classification information in association with each other.

The second storage unit 302 of the cloud server 300 stores information about a device type and information about a type of the molding machine 210. In the embodiment, the device type that is information related to a type of a device is stored in the second storage unit 302. Examples of the device type include "molding machine", "drying device", "extraction device", and "inspection device". In the embodiment, a molding machine type that is information related to a type of the molding machine 210 is stored in the second storage unit 302. Examples of the molding machine type include "molding machine", "multicolor molding machine", and "vertical molding machine".

The second processing unit 301 of the cloud server 300 includes a first receiving unit 310, a second receiving unit 320, a third receiving unit 330, and a fourth receiving unit 340. The first receiving unit 310, the second receiving unit 320, the third receiving unit 330, and the fourth receiving unit 340 are implemented by the second processing unit 301 executing a program stored in the second storage unit 302. These receiving units may be implemented by circuits.

The first receiving unit 310 receives selection of the device identification information stored in the device storage unit 360.

The second receiving unit 320 receives selection of the defect classification information provided in the master data stored in the defect classification storage unit 370.

The third receiving unit 330 receives selection of defect classification information when a defect occurs in a molded article or a material, or when a defect is detected in a molded article.

The fourth receiving unit 340 receives selection of information related to a type of a device used in production of a molded article.

Figure 2:
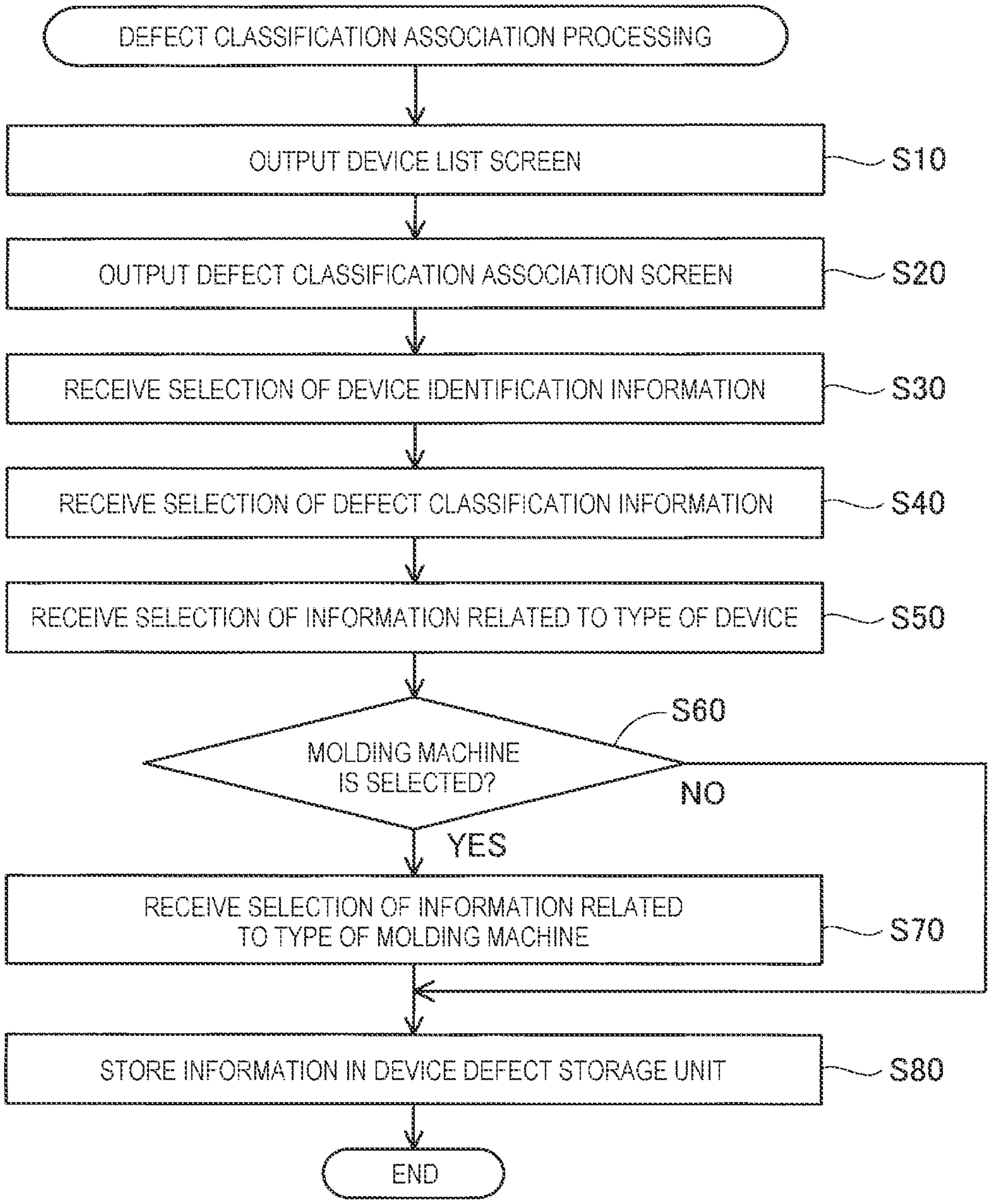
FIG. 2 is a flowchart illustrating defect classification association processing performed by the molding management system.

FIG. 2 is a flowchart illustrating defect classification association processing performed by the molding management system 10. The defect classification association processing is performed when a predetermined operation is performed on the molding management system 10.

In step S10, the second processing unit 301 of the cloud server 300 generates data of a device list screen SC1 on which the device identification information stored in the device storage unit 360 is displayed, and outputs the data to the terminal device 400. The device list screen SC1 is displayed on the display unit 450 of the terminal device 400. The second processing unit 301 may output the generated data of the device list screen SC1 to the molding machine 210 or the management server 100. In this case, the device list screen SC1 is displayed on a display device provided in the molding machine 210 or the management server 100.

Figure 3:
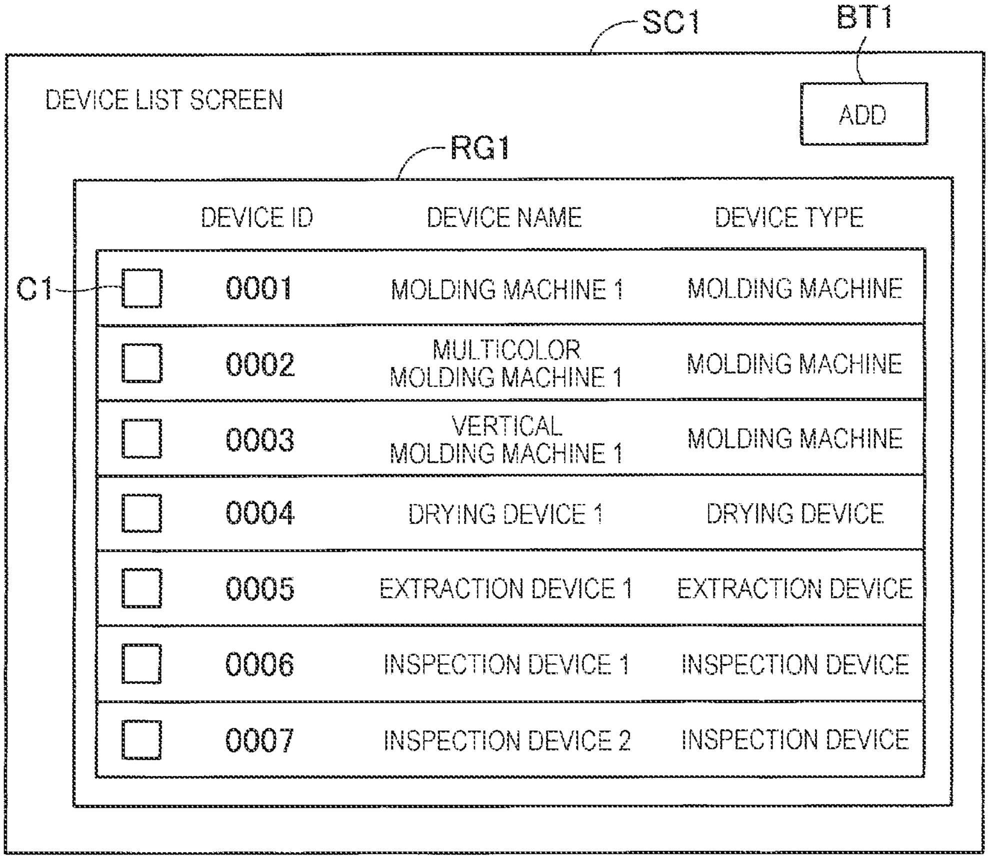
FIG. 3 is a view showing a device list screen.

FIG. 3 is a view illustrating the device list screen SC1. The device list screen SC1 includes a device display region RG1 and an add button BT1.

The device display region RG1 displays, for each device, a device ID that is device identification information, a device name that is device identification information, and a device type that is information related to a type of a device. A check box Cl associated with each device is provided in the device display region RG1.

In step S20 illustrated in FIG. 2, the second processing unit 301 of the cloud server 300 generates data of a defect classification association screen SC2 that is a screen for enabling a user to select defect classification information associated with a device, and outputs the data to the terminal device 400. The defect classification association screen SC2 is displayed on the display unit 450 of the terminal device 400. The step S20 is performed when the add button BT1 is clicked on the device list screen SC1 illustrated in FIG. 3. The second processing unit 301 may output the generated data of the defect classification association screen SC2 to the molding machine 210 or the management server 100. In this case, the defect classification association screen SC2 is displayed on a display device provided in the molding machine 210 or the management server 100.

Figure 4:
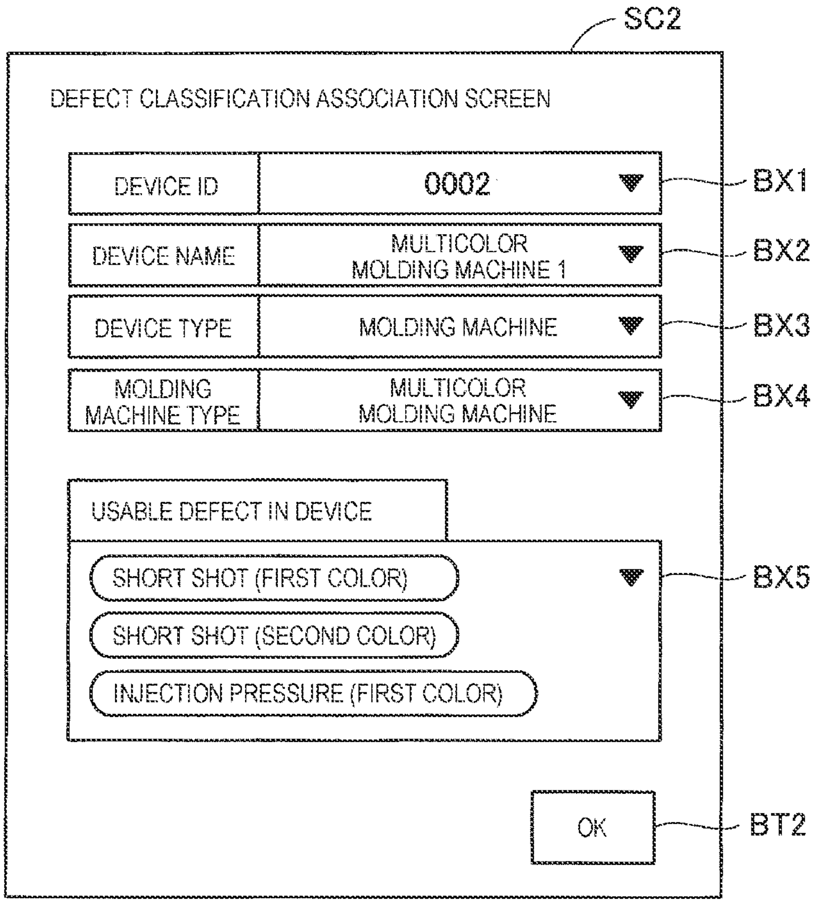
FIG. 4 is a view illustrating a defect classification association screen.

FIG. 4 is a view illustrating the defect classification association screen SC2. The defect classification association screen SC2 includes a selection field BX1, a selection field BX2, a selection field BX3, a selection field BX4, a selection field BX5, and an OK button BT2. A device ID is selected in the selection field BX1. The selection field BX1 is configured to display a list of device IDs stored in the device storage unit 360 when a user clicks the selection field BX1. A device name is selected in the selection field BX2. The selection field BX2 is configured to display a list of device names stored in the device storage unit 360 when a user clicks the selection field BX2. A device type is selected in the selection field BX3. The selection field BX3 is configured to display a list of device types stored in the second storage unit 302 when a user clicks the selection field BX3. A molding machine type is selected in the selection field BX4. The selection field BX4 is configured to display a list of molding machine types stored in the second storage unit 302 when a user clicks the selection field BX4. Defect classification information is selected in the selection field BX5. The selection field BX5 is configured to display a list of defect classification information provided in the master data stored in the defect classification storage unit 370 when a user clicks the selection field BX5.

A user selects information on the defect classification association screen SC2. Hereinafter, the defect information selected by the user on classification association screen SC2 will be described.

The user selects a device ID of a device associated with defect classification information in the selection field BX1, or a device name of a device associated with defect classification information in the selection field BX2. In the selection field BX3, the user selects a device type of a device corresponding to the device identification information selected in the selection field BX1 or the selection field BX2. For example, when device identification information of a multicolor molding machine is selected in the selection field BX1 or the selection field BX2, the user selects "molding machine" in the selection field BX3. When "molding machine" is selected in the selection field BX3, in the selection field BX4, the user selects a molding machine type of the molding machine 210 corresponding to the device identification information selected in the selection field BX1 or the selection field BX2. For example, when the device identification information of the multicolor molding machine is selected in the selection field BX1 or the selection field BX2, the user selects "multicolor molding machine" in the selection field BX4. When "molding machine" is not selected in the selection field BX3, the user does not select anything in the selection field BX4. In the selection field BX5, the user selects defect classification information associated with the device corresponding to the device identification information selected in the selection field BX1 or the selection field BX2. Information selected by the user in each selection field is displayed in the selection field BX1 to the selection field BX5.

In the selection field BX5, the user selects defect classification information indicating that a defect may occur in the device selected in the selection field BX1 or the selection field BX2, or defect classification information indicating that a defect may be detected in the device selected in the selection field BX1 or the selection field BX2. In other words, in the selection field BX5, the user selects defect classification information of a defect specific to the device selected in the selection field BX1 or the selection field BX2. Hereinafter, an example of the defect classification information selected in the selection field BX5 by the user for each device will be described.

When the device is a molding machine, the user selects defect classification information such as a threshold abnormality, folding (molding), deformation (molding), and damage (molding). In this case, the user does not select defect classification information such as a short shot (a first color) or stain (vertical). When the device is a multicolor molding machine, the user selects defect classification information such as a short shot (a first color), a short shot (a second color), injection pressure (a first color), and injection pressure (a second color). In this case, the user does not select defect classification information such as stain (vertical) or a bubble (vertical). When the device is a vertical molding machine, the user selects defect classification information such as stain (vertical), a bubble (vertical), and a transfer defect (vertical). In this case, the user does not select defect classification information such as a short shot (a first color) and a short shot (a second color). When the device is the drying device 251, a user selects defect classification information such as burning (drying) and discoloration (drying). In this case, the user does not select defect classification information such as folding (molding) and falling (extraction). When the device is the extraction device 252, a user selects defect classification information such as falling (extraction), folding (extraction), deformation (extraction), and damage (extraction). In this case, the user does not select defect classification information such as folding (molding) and burning (drying). When the device is the inspection device 253, the user selects defect classification information such as a geometric tolerance and a dimensional defect. In this case, the user does not select defect classification information such as a threshold abnormality and falling (extraction).

In step S30 illustrated in FIG. 2, the first receiving unit 310 receives the device ID selected in the selection field BX1 on the defect classification association screen SC2 illustrated in FIG. 4 or the device name selected in the selection field BX2 as the device identification information. The step S30 and subsequent steps are performed when OK the button BT2 on the defect classification association screen SC2 is clicked.

In step S40 illustrated in FIG. 2, the second receiving unit 320 receives the defect classification information selected in the selection field BX5 on the defect classification association screen SC2 illustrated in FIG. 4.

In step S50 illustrated in FIG. 2, the fourth receiving unit 340 receives the device type selected in the selection field BX3 on the defect classification association screen SC2 illustrated in FIG. 4.

In step S60 illustrated in FIG. 2, the second processing unit 301 of the cloud server 300 determines whether the device identification information received by the first receiving unit 310 in step S30 is the molding machine 210. When it is determined in step S30 that the device identification information received by the first receiving unit 310 is the molding machine 210, step S70 is performed.

In step S70 illustrated in FIG. 2, the fourth receiving unit 340 receives the molding machine type selected in the selection field BX4 on the defect classification association screen SC2 illustrated in FIG. 4. That is, when the first receiving unit 310 receives selection of the device identification information of the molding machine 210, the fourth receiving unit 340 receives selection of information related to a type of the molding machine.

After step S70, or when it is determined in step S60 that the device identification information received by the first receiving unit 310 is not the molding machine 210, step S80 is performed. In step S80, the second processing unit 301 of the cloud server 300 stores, in the device defect storage 380, unit the device identification information received by the first receiving unit 310 in step S30, the defect classification information received by the second receiving unit 320 in step S40, the device type received by the fourth receiving unit 340 in step S50, and the molding machine type received by the fourth receiving unit 340 in step S70 in association with one another. The defect classification association processing is performed as described above.

Figure 5:
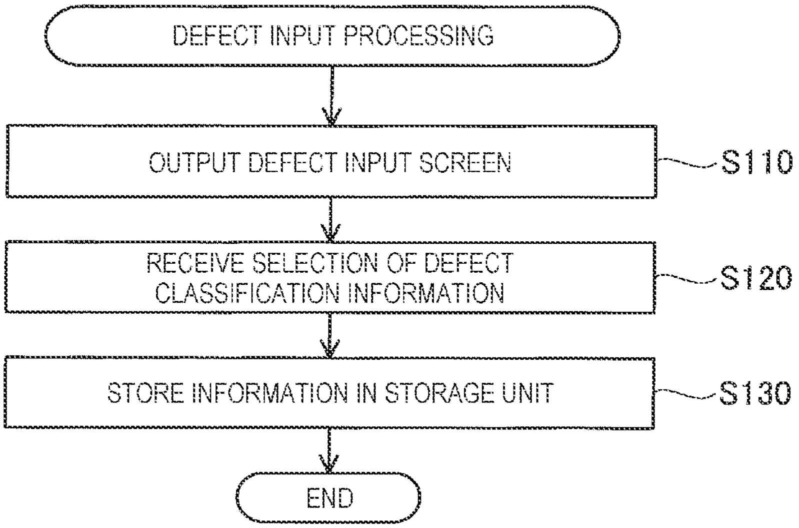
FIG. 5 is a flowchart illustrating defect input processing performed by the molding management system.

FIG. 5 is a flowchart illustrating defect input processing performed by the molding management system 10. The defect input processing is performed when a predetermined operation is performed on the molding management system 10 in a case where a defect occurs in a molded article or a material or in a case where a defect is detected in a molded article.

In step S110, the second processing unit 301 of the cloud server 300 generates data of a defect input screen SC3 that is a screen for enabling a user to select defect classification information, and outputs the data to the terminal device 400. The defect input screen SC3 is displayed on the display unit 450 of the terminal device 400. The second processing unit 301 may output the generated data of the defect input screen SC3 to the molding machine 210 or the management server 100. In this case, the defect input screen SC3 is displayed on a display device provided in the molding machine 210 or the management server 100.

Figure 6:
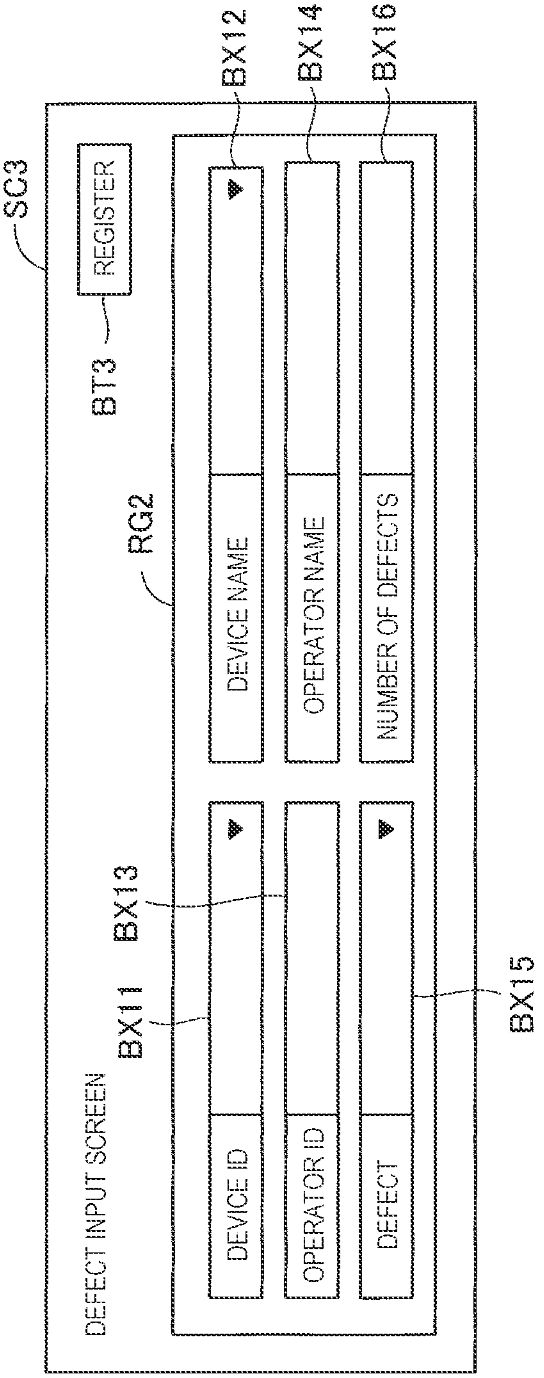
FIG. 6 is a view illustrating a defect input screen.

FIG. 6 is a view illustrating the defect input screen SC3. The defect input screen SC3 includes a defect input region RG2 and a registration button BT3. The defect input region RG2 includes a selection field BX11, a selection field BX12, an input field BX13, an input field BX14, a selection field BX15, and an input field BX16. A device ID is selected in the selection field BX11. The selection field BX11 is configured to display a list of device IDs that are device identification information stored in the device storage unit 360 when a user clicks the selection field BX11. A device name is selected in the selection field BX12. The selection field BX12 is configured to display a list of device names that are device identification information stored in the device storage unit 360 when a user clicks the selection field BX12. An ID number of a user is input to the input field BX13. A name of the user is input to the input field BX14. Defect classification information is selected in the selection field BX15. The selection field BX15 is configured to display a list of defect classification information stored in the device defect storage unit 380 in association with the device identification information selected in the selection field BX11 or the selection field BX12 when a user clicks the selection field BX15. The number of molded articles or materials in which a defect occurs is input to the input field BX16.

A user inputs information to the defect input screen SC3. When a defect occurs in a molded article or a material, the user selects a device ID of a device used in production of the molded article or a device ID of a device that detects the defect in the selection field BX11. When a defect occurs in a molded article or a material, the user selects a device name of a device used in production of the molded article or a device name of a device that detects the defect in the selection field BX12. The user may select the above-described device identification information in either the selection field BX11 or the selection field BX12. The user inputs an ID number of a user in the input field BX13. The user inputs a name of the user in the input field BX14. In the selection field BX15, the user selects defect classification information corresponding to a defect occurring in a molded article or a material or a defect detected in a molded article. The user inputs the number of molded articles in which a defect occurs in the input field BX16.

Hereinafter, an example of information selected by a user on the defect input screen SC3 when a defect occurs in a molded article will be described. For example, when a deformed molded article is molded in molding of a molded article by a molding machine, the user selects device identification information corresponding to the molding machine in the selection field BX11 or the selection field BX12, and selects defect classification information of "deformation (molding)" in the selection field BX15. When a molded article in which a cavity is not sufficiently filled with a shaping material of a first color is molded in molding of a molded article by a multicolor molding machine, the user selects device identification information corresponding to the multicolor molding machine in the selection field BX11 or the selection field BX12, and selects defect classification information of "short shot (first color)" in the selection field BX15. When a molded article including a bubble is molded in molding of a molded article by a vertical molding machine, the user selects device identification information corresponding to the vertical molding machine in the selection field BX11 or the selection field BX12, and selects defect classification information of "bubble (vertical)" in the selection field BX15. When burning is confirmed in a material dried by the drying device 251, the user selects device identification information corresponding to the drying device 251 in the selection field BX11 or the selection field BX12, and selects defect classification information of "discoloration (drying)" in the selection field BX15. When a molded article falls down when the extraction device 252 extracts a molded article from the molding machine 210, the user selects device identification information corresponding to the extraction device 252 in the selection field BX11 or the selection field BX12, and selects defect classification information of "falling (extraction)" in the selection field BX15.

Hereinafter, an example of information selected by a user on the defect input screen SC3 when a defect is detected in a molded article will be described. For example, when the inspection device 253 determines that there is a molded article having a dimensional defect in inspection of a molded article, the user selects device identification information corresponding to the inspection device 253 in the selection field BX11 or the selection field BX12, and selects defect classification information of "dimensional defect" in the selection field BX15.

In step S120 illustrated in FIG. 5, the third receiving unit 330 receives the defect classification information selected in the selection field BX15 on the defect input screen SC3 illustrated in FIG. 6. That is, in a case where a defect occurs in a molded article or a material, the third receiving unit 330 receives selection of defect classification information stored in the device defect storage unit 380 in association with device identification information of a device used in production of the molded article when the defect occurs, or in a case where a defect is detected in a molded article, the third receiving unit 330 receives selection of defect classification information stored in the device defect storage unit 380 in association with device identification information of a device that detects the detect. In step S120, the second processing unit 301 receives the device identification information selected in the selection field BX11 and the selection field BX12 and information input in the input field BX13, the input field BX14, and the input field BX16. The step S120 is performed when the registration button BT3 on the defect input screen SC3 is clicked.

In step S130 illustrated in FIG. 5, the second processing unit 301 stores, in the second storage unit 302, the defect classification information received by the third receiving unit 330 in step S120, the device identification information selected in the selection field BX11 and the selection field BX12, and the information input to the input field BX13, the input field BX14, and the input field BX16 in association with one another. That is, the second processing unit 301 stores, in the second storage unit 302, defect classification information and device identification information of a device used in production of a molded article when a defect occurs or device identification information of a device that detects a defect in association with each other. The defect input processing is performed as described above.

According to the molding management system 10 in the first embodiment described above, device identification information selected from the device identification information stored in the device storage unit 360 and defect classification information selected from the defect classification information provided in the master data stored in the defect classification storage unit 370 are stored in the device defect storage unit 380 in association with each other. In a case where a defect occurs in a molded article or a material, the third receiving unit 330 receives selection of defect classification information stored in the device defect storage unit 380 in association with device identification information of a device used in production of the molded article when the defect occurs, or in a case where a defect is detected in a molded article, the third receiving unit 330 receives selection of defect classification information stored in the device defect storage unit 380 in association with device identification information of a device that detects the detect. Therefore, in a case where a defect occurs in a molded article or a material, the user can select defect classification information stored in the device defect storage unit 380 in association with device identification information of a device used in production of the molded article when the defect occurs. In a case where a defect is detected in a molded article, the user can select defect classification information stored in the device defect storage unit 380 in association with device identification information of a device that detects the defect. Accordingly, it is not necessary to input detailed information of the occurred or detected defect using a keyboard or the like, and thus it is possible to shorten a time taken to input the detailed information of the defect.

In the embodiment, in the defect classification association processing, a user can store only defect classification information of a defect unique to each device in the device defect storage unit 380 in association with device identification information of the device. Therefore, only defect classification information of a defect specific to a device used in production of a molded article when the defect occurs is displayed in the selection field BX15 on the defect input screen SC3 illustrated in FIG. 6. Specifically, when the multicolor molding machine is selected in the selection field BX11 or the selection field BX12 on the defect input screen SC3, only defect classification information of a defect specific to the multicolor molding machine is displayed in the selection field BX15. In addition, only defect classification information of a defect specific to a device that detects a defect is displayed in the selection field BX15 on the defect input screen SC3. Specifically, when the inspection device 253 is selected in the selection field BX11 or the selection field BX12 on the defect input screen SC3, only defect classification information of a defect specific to the inspection device 253 is displayed in the selection field BX15. Therefore, a user can easily select defect classification information of an occurred or detected defect in the defect input processing.

In the embodiment, the defect classification storage unit 370 stores the master data including a plurality of pieces of defect classification information. The master data includes defect classification information specific to each device for all devices. Therefore, a user can edit defect classification information of all the devices by editing one piece of master data. Accordingly, the master data of defect classification information can be easily managed as compared with a case where the master data including defect classification information specific to each device is stored for each device in the defect classification storage unit 370.

B. Second Embodiment

In a second embodiment, a device type is information related to a type of a device and is information related to a type of the molding machine 210 at the same time. Examples of the device type include "molding machine", "multicolor molding machine", "vertical molding machine", "drying device", "extraction device", "inspection device", and "press device".

Figure 7:
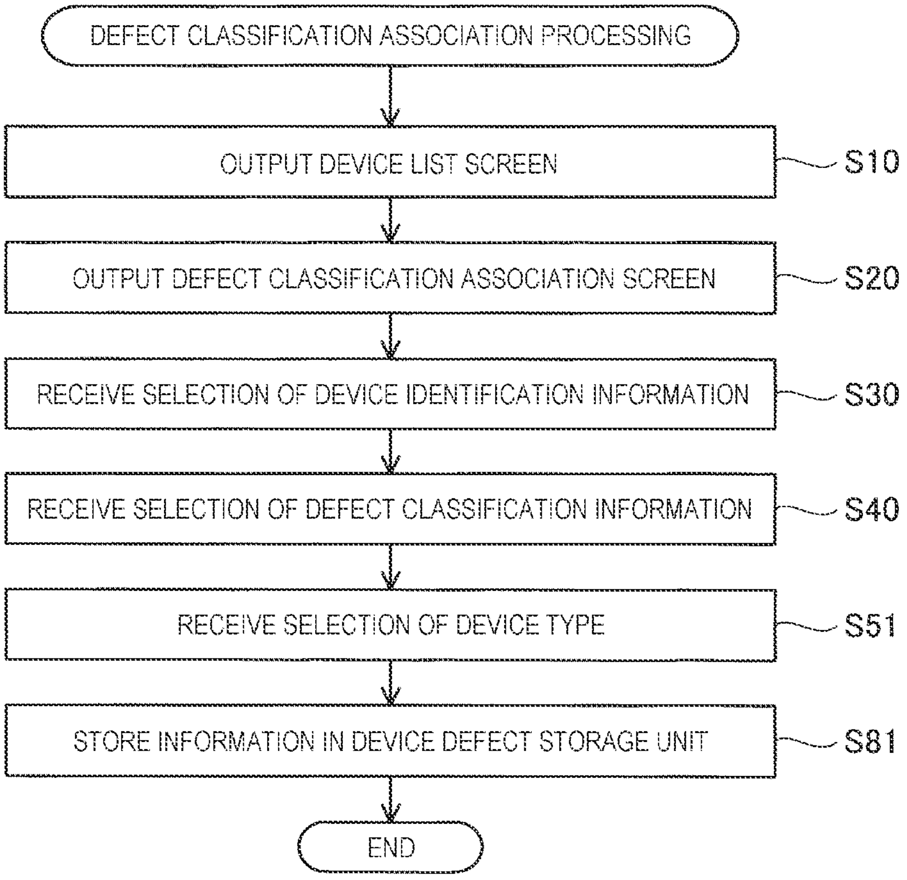
FIG. 7 is a flowchart illustrating defect classification association processing according to a second embodiment.

FIG. 7 is a flowchart illustrating defect classification association processing according to the second embodiment. The same reference numeral is given to a portion where processing the same as the defect classification association processing in the first embodiment illustrated in FIG. 2 is performed, and description thereof will be omitted.

Figure 8:
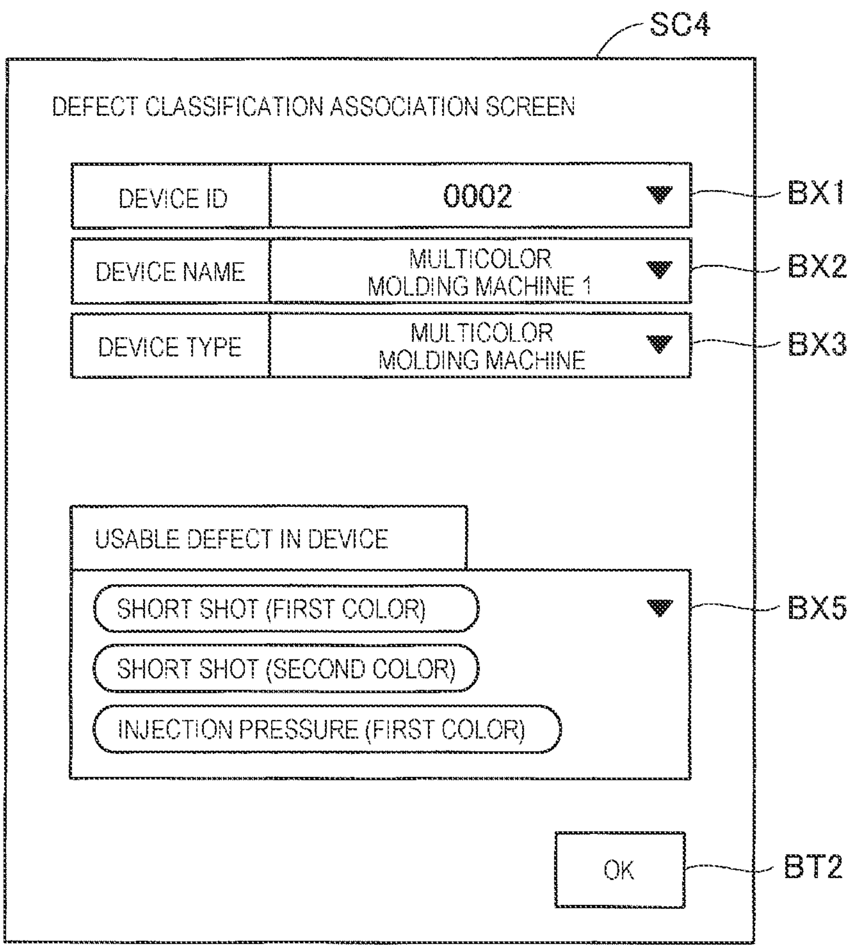
FIG. 8 is a view illustrating a defect classification association screen.

FIG. 8 is a diagram illustrating a defect classification association screen SC4 output in step S20 in FIG. 7. Different from the defect classification association screen SC2 in the first embodiment, the defect classification association screen SC4 does not include the selection field BX4.

In the selection field BX3 on the defect classification association screen SC4 illustrated in FIG. 8, a user selects a device type of a device corresponding device identification information selected in the selection field BX1 or the selection field BX2 in step S20 illustrated in FIG. 7. For example, when the device identification information of a multicolor molding machine is selected in the selection field BX1 or the selection field BX2, the user selects "multicolor molding machine" in the selection field BX3.

In step S51 illustrated in FIG. 7, the fourth receiving unit 340 receives the device type selected in the selection field BX3 on the defect classification association screen SC4 illustrated in FIG. 8. That is, in step S51, the fourth receiving unit 340 receives selection of information related to a type of a device and information related to a type of the molding machine 210.

In step S81, the second processing unit 301 of the cloud server 300 stores, in the device defect storage unit 380, the device identification information received by the first receiving unit 310 in step S30, the defect classification information received by the second receiving unit 320 in step S40, and the device type received by the fourth receiving unit 340 in step S51 in association with one another.

According to the molding management system 10 in the second embodiment described above, in a case where a defect occurs in a molded article or a material, a user can select defect classification information stored in the device defect storage unit 380 in association with device identification information of a device used in production of the molded article when the defect occurs, in a similar manner to the molding management system 10 described in the first embodiment. In a case where a defect is detected in a molded article, the user can select defect classification information stored in the device defect storage unit 380 in association with device identification information of a device that detects the defect. Accordingly, it is not necessary to input detailed information of the occurred or detected defect using a keyboard or the like, and thus it is possible to shorten a time taken to input the detailed information of the defect.

C. Other Embodiments (C-1) In the embodiment described above, the molding management system 10 includes the fourth receiving unit 340. On the other hand, the molding management system 10 may not include the fourth receiving unit 340. In this case, the device defect storage unit 380 may not store information related to a type of a device or information related to a type of the molding machine 210.

(C-2) In the embodiment described above, the molding unit 200 includes the drying device 251, the extraction device 252, and the inspection device 253 as the peripheral machine 250. On the other hand, the molding unit 200 may not include some or all of the drying device 251, the extraction device 252, and the inspection device 253. The molding unit 200 may include a mold temperature adjusting device, a cleaning device, a packaging device, and the like as the peripheral machine 250.

(C-3) In the embodiment described above, the second processing unit 301 of the cloud server 300 includes the first receiving unit 310, the second receiving unit 320, the third receiving unit 330, and the fourth receiving unit 340. On the other hand, the first processing unit 101 of the management server 100 may include some or all of the first receiving unit 310, the second receiving unit 320, the third receiving unit 330, and the fourth receiving unit 340.

(C-4) In the embodiment described above, the second storage unit 302 of the cloud server 300 includes the device storage unit 360, the defect classification storage unit 370, and the device defect storage unit 380. On the other hand, the first storage unit 102 of the management server 100 may include the device storage unit 360, the defect classification storage unit 370, and the device defect storage unit 380.

D. Other Aspects

The present disclosure is not limited to the embodiments described above, and can be implemented in various aspects without departing from the spirit of the present disclosure. For example, the present disclosure can be implemented in the following aspects. In order to solve a part of or all of problems of the present disclosure, or to achieve a part of or all of effects of the present disclosure, technical features of the embodiments described above corresponding to technical features in the following aspects can be replaced or combined as appropriate. The technical features can be deleted as appropriate unless described as being essential in the specification.

(1) According to an aspect of the present disclosure, a molding management system is provided. The molding management system includes: a device storage unit configured to store a plurality of pieces of device identification information that are identification information of a device used in production of a molded article and including at least a molding machine; a defect classification storage unit configured to store master data including a plurality of pieces of defect classification information that are information related to classification of a defect of the molded article or a material used in molding the molded article; a first receiving unit configured to receive selection of the device identification information stored in the device storage unit; a second receiving unit configured to receive selection of the defect classification information provided in the master data; a device defect storage unit configured to store the device identification information received by the first receiving unit and the defect classification information received by the second receiving unit in association with each other; and a third receiving unit configured to receive, in a case where the defect occurs in the molded article or the material, selection of the defect classification information stored in the device defect storage unit in association with the device identification information of the device used in production of the molded article when the defect occurs, or in a case where the defect is detected in the molded article, selection of the defect classification information stored in the device defect storage unit in association with the device identification information of the device that detects the defect.

According to this aspect, when a defect occurs in the molded article or the material, or when a defect is detected in the molded article, a user does not need to input detailed information of the occurred or detected defect using a keyboard or the like, and thus it is possible to shorten a time taken to input the detailed information of the defect.

(2) In the above aspect, the device identification information may include identification information of the molding machine, an inspection device, a drying device, and an extraction device.

According to this aspect, when a defect occurs in the molded article or the material in the device described above, or when a defect is detected in the molded article or the material in the device described above, it is not necessary to input detailed information of the occurred or detected defect using a keyboard or the like, and thus it is possible to shorten a time taken to input the detailed information of the defect.

(3) In the above aspect, the molding management system may further a receiving include fourth unit configured to receive selection of information related to a type of the device, and when the first receiving unit receives selection of the device identification information of the molding machine, the fourth receiving unit may receive selection of information related to a type of the molding machine.

According to this aspect, a user can select information related to a type of the device. When the user selects the device identification information of the molding machine, the user can select information related to a type of the molding machine.

(4) In the above aspect, the fourth receiving unit may receive selection of a multicolor molding machine or a vertical molding machine as the information related to the type of the molding machine.

According to this aspect, a user can select the multicolor molding machine or the vertical molding machine as the information related to the type of the molding machine.

What is claimed is:

1. A molding management system comprising:

an input interface through which an operator inputs information;

a memory configured to store a program; and a processor configured to execute the program so as to:

cause the memory to store a plurality of pieces of device identification information that are identification information of a plurality of devices used in production of a molded article, the plurality of devices including a molding machine configured to mold the molded article, a drying device configured to dry a material used in the molded article, an extraction device configured to extract the molded article from the molding machine, and an inspection device configured to perform dimension measurement and appearance inspection of the molded article based on an image of the molded article captured by a camera;

cause the memory to store master data including a plurality of pieces of defect classification information that are information related to a classification of a defect of the molded article or a material used for molding the molded article, the plurality of pieces of defect classification information including a threshold abnormality, a folding in molding, a deformation in the molding, a damage in the molding, a short shot in a first color, a short shot in a second color, an injection pressure in the first color, an injection pressure in the second color, a stain in a vertical molding, a bubble in the vertical molding, a transfer defect in the vertical molding, a discoloration in drying, falling in extraction, a folding in the extraction, a deformation in the extraction, a damage in the extraction, burning, a burr, a weld line, a flow mark, a geometric tolerance, and a dimensional defect;

receive, via the input interface from the operator, selection of the device identification information stored in the memory;

output, via the input interface, and display defect classification information associated with the selected device identification information among the plurality of pieces of defect classification information and output, via the input interface, and not display defect classification information associated with device identification information other than the selected device identification information;

receive, via the input interface from the operator, selection of the displayed defect classification information;

cause the memory to store the received device identification information and the received defect classification information in association with each other; and receive, via the input interface from the operator, in a case where the defect occurs in the molded article or the material, selection of the defect classification information stored in the memory in association with the device identification information of one of the plurality of devices when the defect occurs, or in a case where the defect is detected in the molded article, selection of the defect classification information stored in the memory in association with the device identification information of the one of the plurality of devices that detects the defect.

2. The molding management system according to claim 1, wherein the processor is further configured to receive, via the input interface from the operator, selection of information related to a type of one of the plurality of devices, and when the processor receives the selection of the device identification information of the molding machine, the processor receives the selection of information related to the type of the molding machine.

3. The molding management system according to claim 2, wherein the processor receives the selection of a multicolor molding machine or a vertical molding machine as the information related to the type of the molding machine.

* * * * *